United States Patent
Kashihara

(10) Patent No.: US 10,976,651 B2
(45) Date of Patent: Apr. 13, 2021

(54) IMAGE DISPLAY APPARATUS AND LIGHT SOURCE APPARATUS

(71) Applicant: SONY CORPORATION, Tokyo (JP)

(72) Inventor: Yoshiki Kashihara, Kanagawa (JP)

(73) Assignee: SONY CORPORATION, Tokyo (JP)

(*) Notice: Subject to any disclaimer, the term of this patent is extended or adjusted under 35 U.S.C. 154(b) by 0 days.

(21) Appl. No.: 16/329,300

(22) PCT Filed: Sep. 28, 2017

(86) PCT No.: PCT/JP2017/035130
§ 371 (c)(1),
(2) Date: Feb. 28, 2019

(87) PCT Pub. No.: WO2018/070253
PCT Pub. Date: Apr. 19, 2018

(65) Prior Publication Data
US 2019/0250492 A1    Aug. 15, 2019

(30) Foreign Application Priority Data
Oct. 12, 2016    (JP) .............................. JP2016-201211

(51) Int. Cl.
*G03B 21/20*    (2006.01)
*G03B 21/16*    (2006.01)
(Continued)

(52) U.S. Cl.
CPC .......... *G03B 21/204* (2013.01); *F21V 29/502* (2015.01); *F21V 29/70* (2015.01);
(Continued)

(58) Field of Classification Search
CPC ....... F21V 29/502; F21V 29/70; G03B 21/00; G03B 21/14; G03B 21/16; G03B 21/204; H04N 5/74; G02B 26/008; G02B 87/008
See application file for complete search history.

(56) References Cited

U.S. PATENT DOCUMENTS

| 2012/0106126 A1* | 5/2012 | Nojima ................ G02B 26/008 362/84 |
| 2013/0021582 A1* | 1/2013 | Fujita .................. G03B 21/204 353/31 |

(Continued)

FOREIGN PATENT DOCUMENTS

| JP | 2009075588 A | 4/2009 |
| JP | 2012-8177 A | 1/2012 |

(Continued)

OTHER PUBLICATIONS

International Search Report dated Dec. 19, 2017 in PCT/JP2017/035130 filed Sep. 28, 2017.

(Continued)

*Primary Examiner* — Zheng Song
(74) *Attorney, Agent, or Firm* — Oblon, McClelland, Maier & Neustadt, L.L.P.

(57) ABSTRACT

An image display apparatus according to an embodiment of the present technology includes a base, a light emission body, a dichroic film, and a heat conduction member. The light emission body is provided on the base, and emits visible light by being excited by excitation light. The dichroic film reflects at least a part of the visible light emitted from the light emission body. The heat conduction member is provided on the base, and diffuses heat transmitted from the light emission body to the base.

16 Claims, 10 Drawing Sheets

(51) Int. Cl.
  *G02B 26/00* (2006.01)
  *H04N 5/74* (2006.01)
  *F21V 29/502* (2015.01)
  *F21V 29/70* (2015.01)
  *G03B 21/00* (2006.01)
  *G03B 21/14* (2006.01)
  *F21V 9/20* (2018.01)
  *F21V 9/35* (2018.01)

(52) U.S. Cl.
  CPC ............ *G02B 26/008* (2013.01); *G03B 21/00* (2013.01); *G03B 21/14* (2013.01); *G03B 21/16* (2013.01); *H04N 5/74* (2013.01); *F21V 9/20* (2018.02); *F21V 9/35* (2018.02)

(56) References Cited

U.S. PATENT DOCUMENTS

| | | | |
|---|---|---|---|
| 2013/0169938 A1 | 7/2013 | Huang et al. | |
| 2015/0062543 A1* | 3/2015 | Ogawa | G03B 21/204 353/84 |
| 2015/0219327 A1* | 8/2015 | Adema | F21V 29/503 362/373 |
| 2016/0077326 A1* | 3/2016 | Yamagishi | G02B 26/008 353/61 |
| 2017/0099467 A1* | 4/2017 | Egawa | G02B 26/008 |
| 2017/0244939 A1* | 8/2017 | Arakawa | G03B 21/204 |
| 2017/0293211 A1* | 10/2017 | Kobayashi | G03B 21/00 |
| 2018/0024424 A1* | 1/2018 | Hu | F21V 29/502 362/322 |
| 2018/0031957 A1* | 2/2018 | Egawa | G02B 26/008 |
| 2018/0059403 A1* | 3/2018 | Takamatsu | F21V 9/40 |

FOREIGN PATENT DOCUMENTS

| | | |
|---|---|---|
| JP | 2012-137608 A | 7/2012 |
| JP | 2014-2416 A | 1/2014 |
| JP | 2016-66061 A | 4/2016 |
| WO | WO-2016056285 A | 4/2016 |
| WO | WO 2016/110888 A1 | 7/2016 |
| WO | WO 2016/14785 | 9/2016 |
| WO | WO 2017/10177 | 6/2017 |

OTHER PUBLICATIONS

Extended European Search Report dated Sep. 19, 2019 in Patent Application No. 17860135.7, 8 pages.

* cited by examiner

IMAGE DISPLAY APPARATUS AND LIGHT SOURCE APPARATUS

TECHNICAL FIELD

The present technology relates to an image display apparatus such as a projector, and a light source apparatus that can be applied to this.

BACKGROUND ART

In recent years, there has been a growth in the number of products which adopt not a mercury lamp, a xenon lamp, and the like conventional used but a solid-state light source such as an LED (Light Emitting Diode) and an LD (Laser Diode) for a light source to be used for a projector for the purpose of presentation or digital cinema. A solid-state light source such as an LED has a long life, and thus a conventional lamp exchange is unnecessary. Further, a solid-state light source has such an advantage as to be lighted immediately after being turned on.

For example, Patent Literature 1 describes a projector that uses a laser light source. The projector described in Patent Literature 1 uses a phosphor wheel obtained by applying phosphor on a substrate, a center portion of which is opened. The phosphor of the phosphor wheel is irradiated with laser light emitted from the laser light source, and fluorescence is generated by excitation. A part of the laser light and the generated fluorescence are emitted as illumination light, thereby generating an image. It should be noted that on the phosphor wheel, a heatsink is provided. This cools heat generated from the phosphor due to illumination with the laser light.

CITATION LIST

Patent Literature

Patent Literature 1: Japanese Patent Application Laid-open No. 2012-8177

DISCLOSURE OF INVENTION

Technical Problem

In recent years, a higher luminance of image displaying has been developed. Laser light or the like with a high output is emitted to a phosphor. A technology which suppresses an influence due to heat generation from a phosphor at this time and is capable of achieving image displaying with a high luminance with a high reliability is being demanded.

In view of the circumstances as described above, an object of the present technology is to provide an image display apparatus and a light source apparatus capable of achieving image displaying with a high luminance with a high reliability.

Solution to Problem

To achieve the object described above, an image display apparatus according to an embodiment of the present technology includes a base, a light emission body, a dichroic film, and a heat conduction member.

The light emission body is provided on the base, and emits visible light by being excited by excitation light.

The dichroic film reflects at least a part of the visible light emitted from the light emission body.

The heat conduction member is provided on the base, and diffuses heat transmitted from the light emission body to the base.

In the image display apparatus, the part of the visible light emitted from the light emission body is reflected by the dichroic film. With this configuration, it is possible to improve a light collection efficiency of the visible light. Further, by the heat conduction member, heat transmitted from the light emission body to the base is diffused. With this configuration, it is possible to suppress a deformation or the like of the base due to a deviation of the temperature distribution. As a result, it is possible to achieve image displaying with a high luminance with a high reliability.

The heat conduction member may be provided in a vicinity of the light emission body.

With this configuration, it is possible to sufficiently diffuse heat transmitted to the base. As a result, it is possible to sufficiently suppress the deformation or the like of the base and achieve image displaying with a high reliability.

The heat conduction member may be provided in contact with the light emission body.

With this configuration, heat generated from the light emission body can be sufficiently radiated by the heat conduction member, and thus an influence of heat on the base can be suppressed.

The light emission body may be provided on a circumference of the base. In this case, the heat conduction member may be provided on a center of the base.

With this configuration, heat on the circumference of the base can be diffused to the center of the base. As a result, it is possible to achieve image displaying with a high reliability.

The base may include a support surface that supports the light emission body and an opposite surface to the support surface. In this case, the heat conduction member may be disposed on at least one of the support surface and the opposite surface.

With this configuration, heat transmitted to the base can be diffused along either one of the surfaces of the base. As a result, it is possible to achieve image displaying with a high reliability.

The base may have a disc shape without a hole. In this case, the heat conduction member may be provided in an area including a center of at least one of the support surface and the opposite surface.

By using the base without a hole, durability of the base can be improved, the deformation or the like of the base can be sufficiently suppressed. With this configuration, it is possible to exert a high reliability.

The dichroic film may be provided on the support surface. In this case, the light emission body may be provided on the dichroic film provided on the support surface. Further, the excitation light may be transmitted through the dichroic film from the opposite surface and is incident on the light emission body.

With this configuration, it is possible to reflect the visible light emitted toward the support surface. As a result, it is possible to improve a light collection efficiency of the visible light and achieve image displaying with a high luminance.

The image display apparatus may further include a rotation drive unit that causes the base to rotate.

By rotating the base, a position irradiated with the excitation light can be moved, and a load on the light emission body can be alleviated. Further, a heat generation portion of the light emission body is spread out, and thus it is possible to sufficiently alleviate the deviation of the temperature distribution of the base. As a result, it is possible to improve a reliability of image displaying.

The rotation drive unit may include a rotation member that is connected to the base and has a heat conduction property.

With this configuration, it is possible to cause the rotation member to function as the heat conduction member. Thus, cost of components can be reduced, and a size reduction of the apparatus can be achieved.

The heat conduction member may be provided in an area including the center of the support surface. In this case, the rotation member may be connected to an area including the center of the opposite surface.

With this configuration, heat transmitted to the base can be effectively diffused. As a result, it is possible to achieve image displaying with a high luminance with a sufficiently high reliability.

The heat conduction member may be provided in an area including the center of the opposite surface. In this case, the rotation member may be connected to the heat conduction member provided on the opposite surface.

With this configuration, heat generated from the light emission body can be efficiently radiated through the heat conduction member and the rotation member.

The rotation member may be connected to an area including the center of the opposite surface. In this case, the heat conduction member may be provided around the rotation member.

With this configuration, it is possible to reduce a use amount of the heat conduction member, so it is possible to reduce cost of the components.

The light emission body may be provided in each of a first band-like area on a circumference of the support surface and a second band-like area inside the first band-like area. In this case, the heat conduction member may be provided in each of an area between the first and second band-like areas and an area including the center inside the second band-like area.

With this configuration, it is possible to increase a light amount of the visible light. As a result, it is possible to achieve higher luminance of image displaying.

A light source apparatus according to an embodiment of the present technology includes a base, a light emission body, a dichroic film, and a heat conduction member.

The light emission body is provided on the base, and emits visible light by being excited by excitation light.

The dichroic film reflects at least a part of the visible light emitted from the light emission body.

The heat conduction member is provided on the base, and diffuses heat transmitted from the light emission body to the base.

Advantageous Effects of Invention

As described above, according to the present technology, it is possible to achieve image displaying with a high luminance with a high reliability. It should be noted that the effects described herein are not necessarily limited, and any effect described in this disclosure may be obtained.

MODE(S) FOR CARRYING OUT THE INVENTION

Hereinafter, embodiments according the present technology will be described with reference to the drawings.

First Embodiment

Image Display Apparatus

Figure 1:
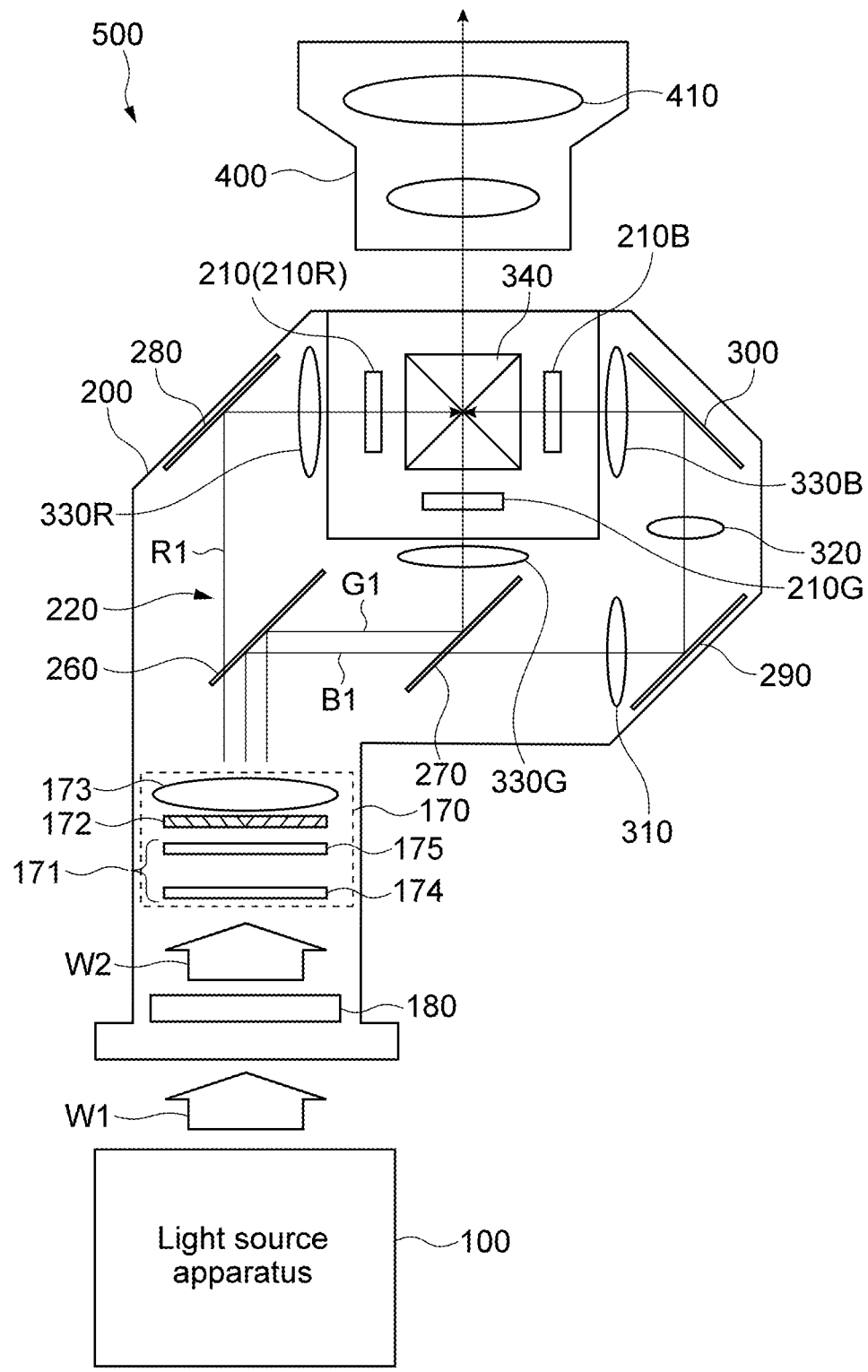
FIG. 1 A schematic diagram showing a configuration example of an image display apparatus according to a first embodiment.

FIG. 1 is a schematic diagram showing a configuration example of an image display apparatus according to a first embodiment of the present technology. An image display apparatus 500 is used as, for example, a presentation projector or a digital cinema projector. To image display apparatuses for other purposes, the present technology described below can also be applied.

The image display apparatus 500 includes a light source apparatus 100, an image generation system 200, and a projection system 400.

The light source apparatus 100 emits white light W1 to the image generation system 200. The light source apparatus 100 will be described in detail later.

The image generation system 200 generates an image on the basis of the white light W1 emitted from the light source apparatus 100. The image generation system 200 includes an optical filter 180, an integrator optical system 170, an illumination optical system 220, and an image generation element 210.

The optical filter 180 is a dielectric multilayer film filter having a dielectric multilayer film, and functions as a wavelength selection filter. The optical filter 180 performs filtering with respect to the white light W1 emitted from the light source apparatus 100, and thus a spectrum (wavelength characteristic) of the white light W1 is adjusted. White light W2 obtained by performing filtering is emitted to the integrator optical system 170. It should be noted that a specific material of the dielectric multilayer film is not limited, and an appropriate material such as to exert a desired filtering characteristic, such as titanium oxide and an oxide silicon may be selected, for example.

The integrator optical system 170 includes an integrator element 171, a polarization conversion element 172, and a light collection lens 173.

The integrator element 171 includes a first fly-eye lens 174 having a plurality of micro lenses which are two-dimensionally arranged and a second fly-eye lens 175 which are arranged so as to correspond to the plurality of micro lenses, respectively.

The white light W2 that is incident on the integrator element 171 is divided into a plurality of beams by the micro lenses of the first fly-eye lens 174, and the beams are imaged on the corresponding micro lenses provided on the second fly-eye lens 175. The micro lenses of the second fly-eye lens 175 respectively function as secondary light sources. A plurality of parallel light beams with a uniform luminance are emitted to the polarization conversion element 172 on a later stage.

The polarization conversion element 172 has a function of uniformizing a polarization state of incident light incident through the integrator element 171. Light that passes through the polarization conversion element 172 is emitted to the illumination optical system 220 through the light collection lens 173.

The integrator optical system 170 has a function of adjusting the white light W2 from the optical filter 180 to the illumination optical system 220 to obtain a uniform luminance distribution as a whole, to obtain light with a uniform polarization state. A specific configuration of the integrator optical system 170 is not limited.

The illumination optical system 220 includes dichroic mirrors 260 and 270, mirrors 280, 290, and 300, field lenses 330R, 330G, and 330B, relay lenses 310 and 320, liquid crystal light valves 210R, 210G, and 210B as image generation elements, and a dichroic prism 340.

The dichroic mirrors 260 and 270 have a property of reflecting color light in a predetermined wavelength range selectively and transmitting light in the other wavelength range. The dichroic mirror 260 selectively reflects green light G1 included in the white light W2 and blue light B1 and transmits red light R1 included in the white light W2. The dichroic mirror 270 selectively reflects the green light G1 reflected by the dichroic mirror 260 and transmits the blue light B1. As a result, different color light is separated to different light paths, respectively. It should be noted that a configuration for separating RGB colors, a device to be used, or the like is not limited.

The separated red light R1 is parallelized by the mirror 280, and parallelized by the field lenses 330R. After that, the light is incident on the liquid crystal light valve 210R for modification of red light. The green light G1 is parallelized by the field lenses 330G, and then is incident on the liquid crystal light valve 210G for modification of blue light. The blue light B1 is passed through the relay lens 310 and reflected by the mirror 290. Further, the light is passed through the relay lens 320 and reflected by the mirror 300. The blue light B1 reflected by the mirror 300 is parallelized by the field lenses 330B, and then is incident on the liquid crystal light valve 210B for modification of blue light.

The liquid crystal light valves 210R, 210G, and 210B are electrically connected with a signal source (not shown) (for example, PC or the like) which supplies an image signal including image information. On the basis of the supplied image signal of each light, the liquid crystal light valves 210R, 210G, and 210B modify the incident light for each pixel, and generate a red image, a green image, and a blue image. The modified light of each color (formed images) is incident on the dichroic prism 340 and synthesized. The dichroic prism 340 superposes the light of the respective colors which is incident from three directions, synthesizes the light, and causes the light to emit toward the projection system 400.

The projection system 400 projects the image generated by the image generation element 210. The projection system 400 includes a plurality of lenses 410 and the like, and projects the light synthesized by the dichroic prism 340 on a screen or the like (not shown). As a result, a full-color image is displayed. A specific configuration of the projection system 400 is not limited.

Light Source Apparatus

Figure 2:
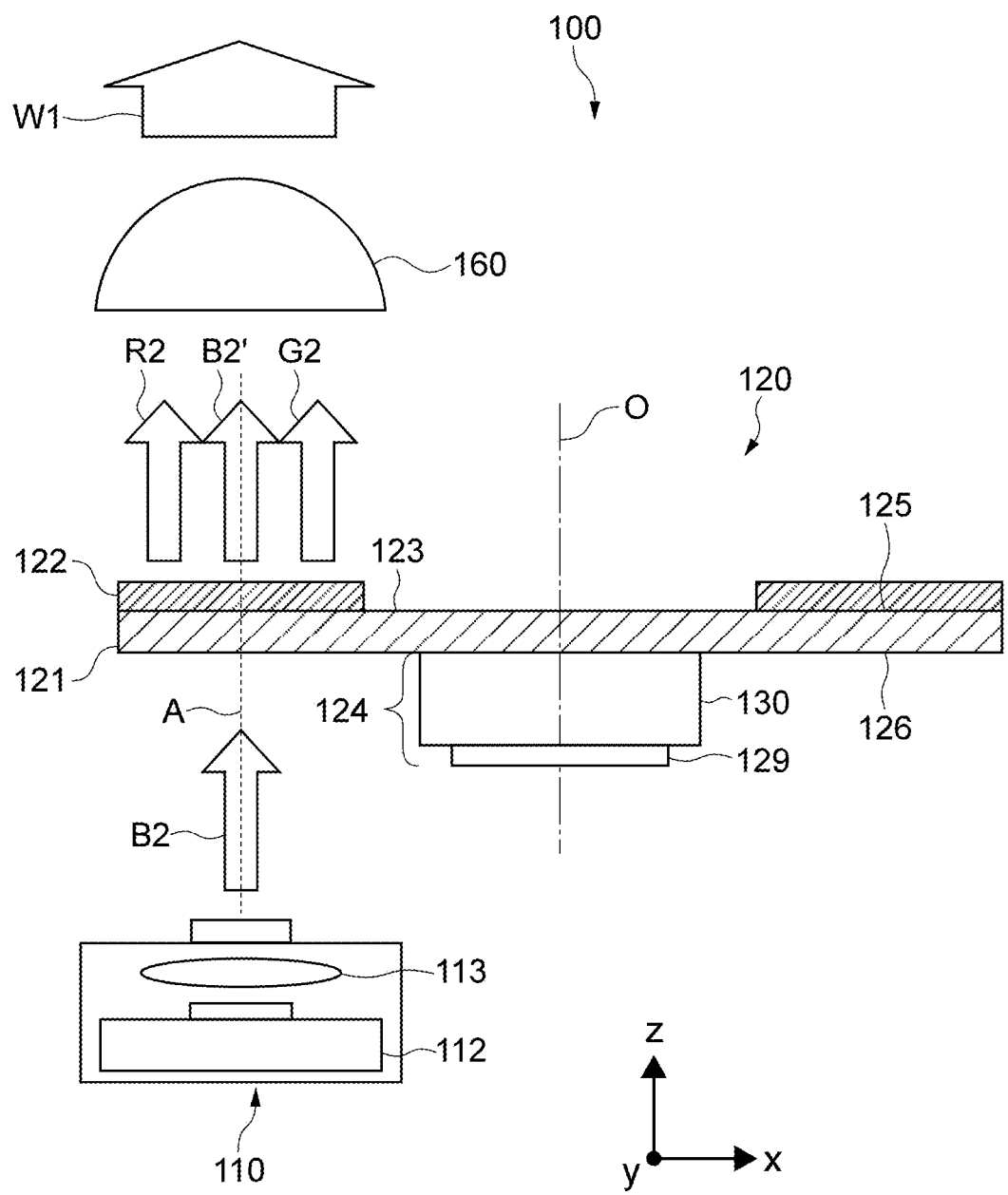
FIG. 2 A schematic diagram showing a configuration example of a light source apparatus according to the first embodiment.

FIG. 2 is a schematic diagram showing a configuration example of the light source apparatus 100 according to this embodiment. The light source apparatus 100 includes a light source unit 110, a phosphor wheel 120, and a collimating optical system 160.

The light source unit 110 includes one or more laser light sources 112 and a light collection optical system 113. The one or more laser light sources 112 are blue laser light sources capable of oscillating a blue laser light B2 having a peak wavelength of a light emission intensity within a wavelength range of approximately 400 nm to approximately 500 nm, for example. Instead of the laser light sources 112, another solid-state light source such as an LED and the like may be used. Further, a laser light source of another color may be used.

As the one or more laser light sources 112, a single laser light source may be used, or a two-dimensional laser array light source (surface light source) in which a plurality of laser light sources is two-dimensionally arranged may be used. In addition, the configuration of the light source unit 110 may be designed arbitrarily.

The light collection optical system 113 collects the blue laser light B2 emitted from the laser light sources 112. As a result, the blue laser light B2 is emitted along an optical axis A. A specific configuration of the light collection optical system 113 is not limited.

The phosphor wheel 120 includes a base portion 121, a phosphor layer 122, and a motor 124. The base portion 121 has a support surface 125 that supports the phosphor layer 122 and the like and a back surface 126 on an opposite side thereto. In this embodiment, the base portion 121 corresponds to a base, and the support surface 125 and the back surface 126 correspond to a support surface that supports a light emission body and a surface opposite thereto, respectively.

The base portion 121 causes the blue laser light B2 emitted from the laser light sources 112 to pass therethrough. As the base portion 121, for example, a member made of sapphire glass, crystal glass, carbon ceramics, spinel, white plate glass, quartz glass, or the like is used. Another transparent member having a high heat conductivity may be used as appropriate.

The phosphor layer 122 includes a phosphor that generates light by excitation. As the phosphor included in the phosphor layer 122, for example, YAG (Yttrium Aluminum Garnet)-based phosphor is used. It should be noted that a kind of the phosphor, a wavelength range of light to be excited, and a wavelength range of light generated by excitation are not limited. The phosphor layer 122 corresponds to a light emission body in this embodiment.

In this embodiment, by the blue laser light B2 emitted from the light source unit 110, the phosphor layer 122 is excited, fluorescence (yellow light) including red light R2 and green light G2 is generated. Further, the phosphor layer 122 causes a part of the incident blue laser light B2 to pass therethrough as it is and emits the light as blue laser light B2'. Accordingly, from the phosphor layer 122, the red light R2, the green light G2, and the white light W1 including the blue laser light B2' are emitted.

The motor 124 is provided on a center of the back surface 126 of the base portion 121, and causes the base portion 121 to rotate around a rotation axis O. In this embodiment, the motor 124 is a motor of an outer rotor type, and includes a stator 129 and a rotor 130 that is provided so as to cover the stator 129. The rotor 130 connected with the back surface 126 of the base portion 121 is rotated, with the result that the base portion 121 is rotated around the rotation axis O. In this embodiment, the motor 124 and the rotor 130 correspond to a rotation drive unit and a rotation member, respectively.

In addition, the phosphor wheel 120 includes a heat conduction member, a dichroic film, and an AR film. A detailed configuration of the phosphor wheel will be described later.

The collimating optical system 160 is disposed on the optical axis A, and parallelizes the white light W1, which is synthesized light including the red light R2, the green light G2, and the blue laser light B2' from the phosphor layer 122. The parallelized white light W1 is emitted toward the image generation system 200. A specific configuration of the collimating optical system 160 is not limited, and for example, a collimating lens or the like is used as appropriate.

Phosphor Wheel

Figure 3A:
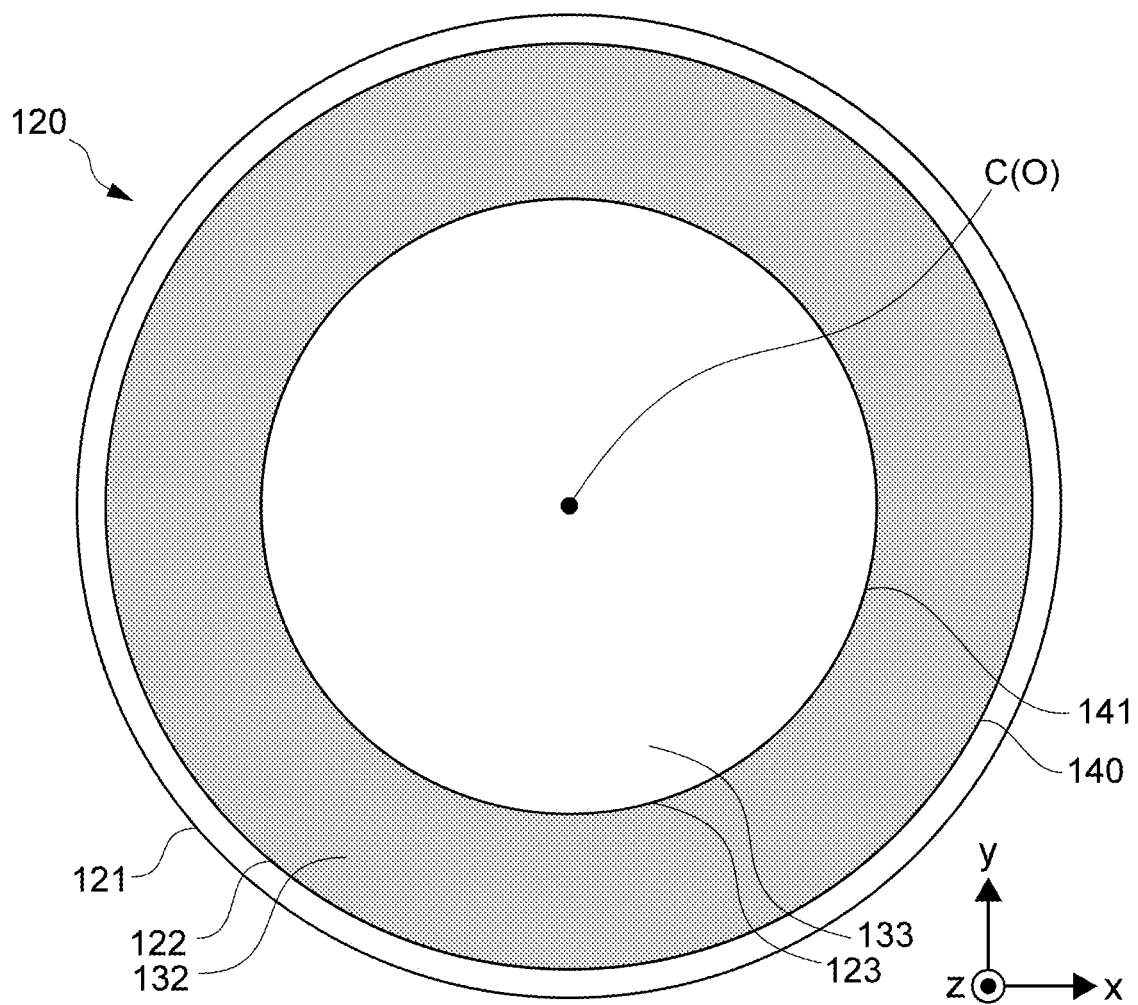
FIG. 3 A schematic diagram showing a specific configuration example of a phosphor wheel.
Figure 3B:
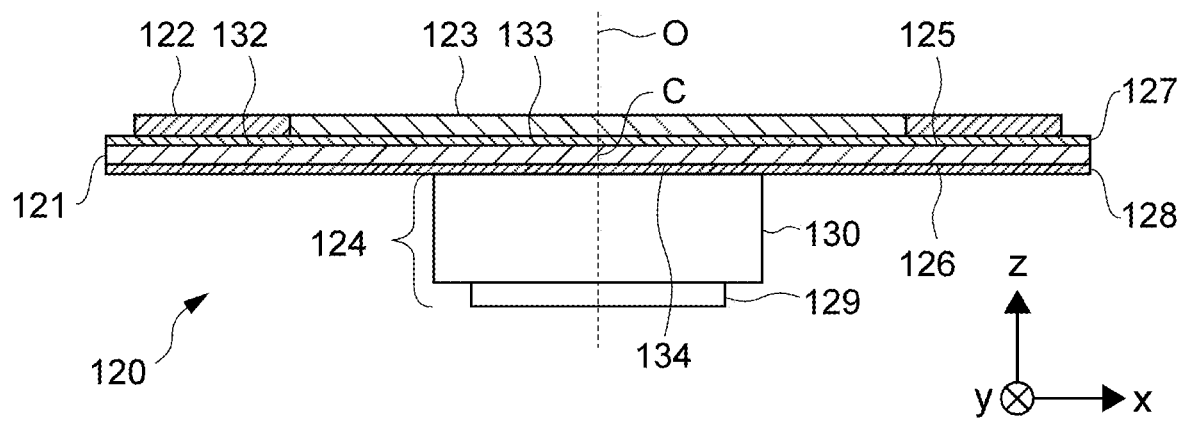

FIG. 3 is a schematic diagram showing a specific configuration example of the phosphor wheel 120. FIG. 3A is a plan view of the phosphor wheel 120 viewed from the support surface 125 side. FIG. 3B is a cross-sectional view of the phosphor wheel 120 taken along a line including a center C of the support surface 125 (cross-sectional view of the motor 124 is omitted).

As shown in FIG. 3A, the base portion 121 has a disc shape with no hole, an outline of which is a circular shape in a plan view. At the center C of the support surface 125 (back surface 126) of the base portion 121, a rotation axis C of the motor 124 is set.

As shown in FIGS. 3A and 3B, the phosphor wheel 120 further includes a dichroic film 127, a heat conduction member 123, and an AR film 128.

The dichroic film 127 is formed on the support surface 125 of the base portion 121. In this embodiment, the dichroic film 127 is formed so as to cover the entire support surface 125 of the base portion 121. The dichroic film 127 has a wavelength selectivity that yellow light generated from the phosphor layer 122 is reflected, and the blue laser light B2 is transmitted.

As the dichroic film 127, for example, a dielectric multilayer film or the like is used. An area in which the dichroic film 127 is provided is not limited, and the dichroic film 127 may be provided in an arbitrary area where yellow light that travels toward the support surface 125 can be reflected.

The phosphor layer 122 is provided on a film of the dichroic film 127. Here, the "on the film of the dichroic film 127" corresponds to "on a surface opposite to the base portion 121 side of the dichroic film 127". As described above, the phosphor layer 122 is provided to the base portion 121 with the dichroic film 127 intervened therebetween.

As shown in FIG. 3A, the area in which the phosphor layer 122 is provided is a band-like area 132 with the center C of the support surface 125 as a reference. That is, the band-like area 132 is an area surrounded by an outer circle 140 having the center C as a center and an inner circle 141 having a radius smaller than that of the outer circle 140, and is set in the vicinity of a circumference of the support surface 125. Therefore, the phosphor layer 122 is formed on the circumference of the base portion 121.

The heat conduction member 123 is formed on the film of the dichroic film 127. That is, the heat conduction member 123 is provided to the base portion 121 with the dichroic film 127 intervened therebetween. The heat conduction member 123 is provided in a center area 133 including the center C of the support surface 125. In this embodiment, an inner side of an inner circumference (inner circle 141) of the band-like area 132 entirely corresponds to the center area 133. Therefore, the heat conduction member 123 is provided so as to be in contact with the inside of the phosphor layer 122. In addition to this, the heat conduction member 123 may be provided so as to be distanced from the phosphor layer 122. That is, an area smaller than the inner circle 141 may be set as the center area 133.

For example, a diameter of the support surface 125 is approximately 50 mm, and the phosphor layer 122 is provided in the band-like area 132 having a width of approximately 10 mm from the circumference toward the center. In the center area 133 inside the phosphor layer 122, the heat conduction member 123 is provided. It should be noted that the areas in which the phosphor layer 122 and the heat conduction member 123 are provided are not limited. It is sufficient that the areas are set in such a manner that heat transmitted from the phosphor layer 122 to the base portion 121 can be diffused.

The heat conduction member 123 is configured by a member having a higher heat conductivity than the base portion 121. As the heat conduction member 123, for example, aluminum nitride, a graphite sheet, copper, aluminum, or the like is used. The member that configures the heat conduction member 123 is not limited and is appropriately selected depending on the member of the base portion 121. For example, a member having a higher heat conductivity than the member of the base portion 121 and having a similar thermal expansion rate thereto may be used.

The AR film 128 is provided on the back surface 126 of the base portion 121. In this embodiment, the AR film 128 is formed so as to cover the back surface 126 of the base portion 121. The AR film 128 is an antireflection film that prevents reflection of the blue laser light B2 incident on the back surface 126. With this configuration, a light amount of the blue laser light B2 incident on the base portion 121 is increased, and thus an irradiation amount with respect to the phosphor layer 122 is increased. As a result, it is possible to increase the amount of generated yellow light, thereby making it possible to achieve a high luminance.

As the AR film 128, for example, a dielectric multilayer film or the like is used. An area in which the AR film 128 is provided is not limited, and is provided as appropriate in accordance with the area irradiated with the blue laser light B2, for example.

The rotor 130 is connected onto a film of the AR film 128. Here, "onto the film of the AR film 128" corresponds to "onto a surface opposite to the base portion 121 side of the AR film 128. An area to which the rotor 130 is connected is a connection area 134 including the center C of the back surface 126. The rotor 130 is connected to the connection area 134 in such a manner that the center (which corresponds to the position of the rotation axis O) of the rotor 130 coincides with the center C of the back surface 126. A size and shape of the connection area 134 including the center C of the back surface 126 are not limited.

A method of connecting the heat conduction member 123 to the support surface 125 with the dichroic film 127 intervened therebetween, and a method of connecting the rotor 130 to the back surface 126 with the AR film 128 intervened therebetween are not limited. For example, by performing surface adhesion with a use of a heat conduction adhesive containing metal, such as a conductive paste, it is also possible to thermally connect the members. As a result, thermal resistances among the respective members are reduced, and temperature differences among the members can be effectively reduced.

Figure 4:
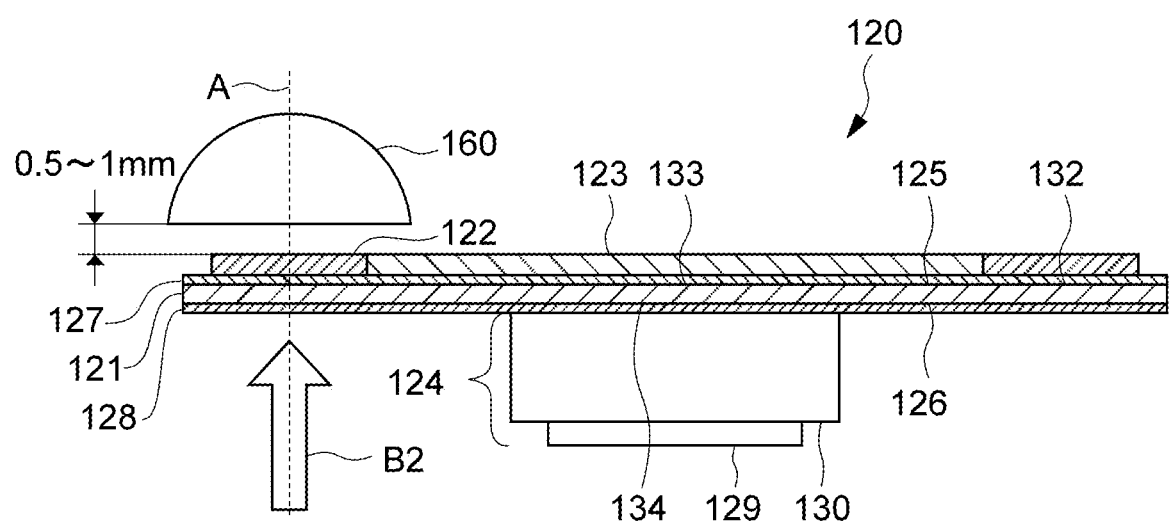
FIG. 4 A diagram for explaining generation of white light in detail.
Figure 5:
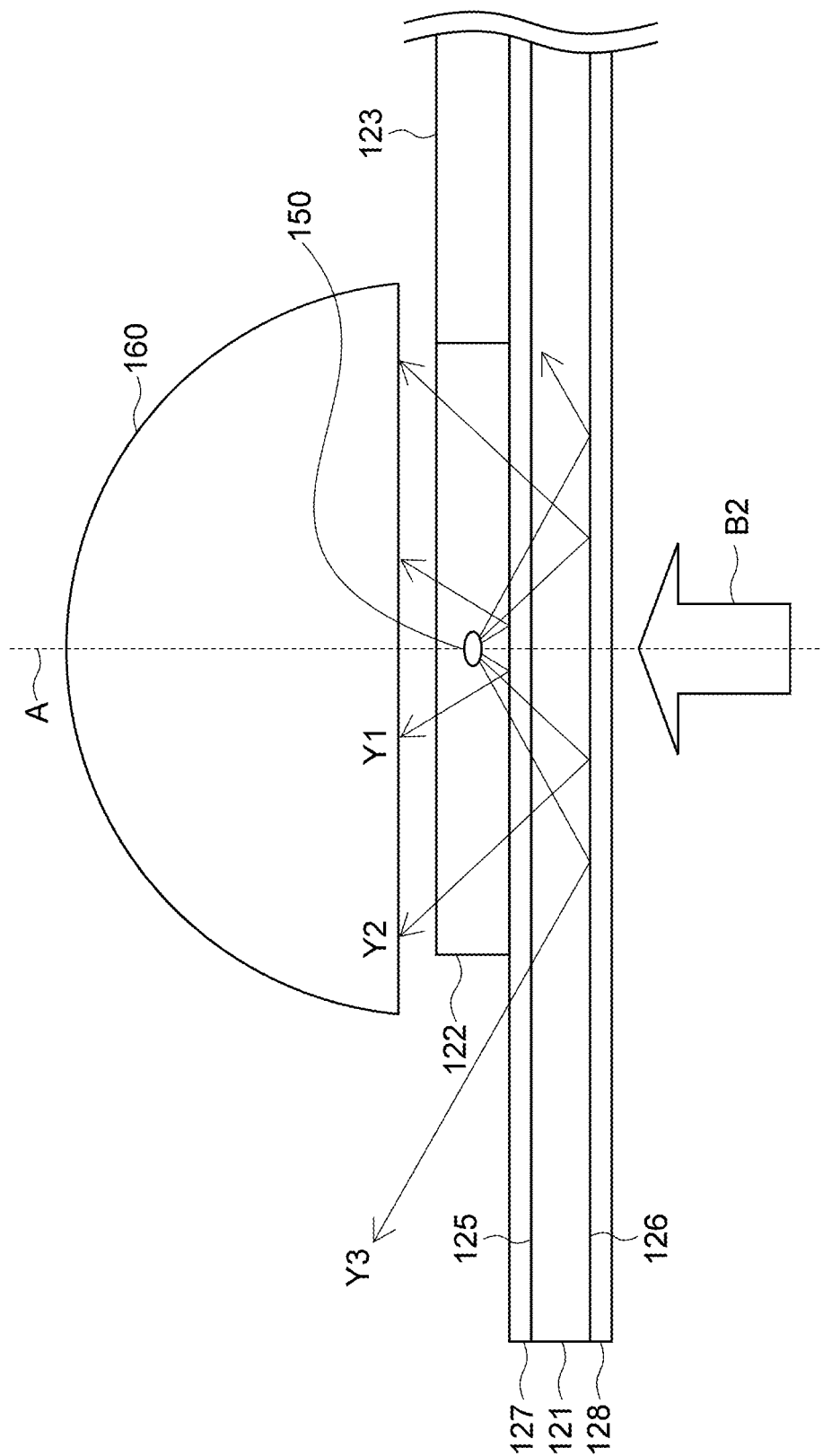
FIG. 5 A schematic diagram for explaining a light path of yellow light generated from a light collection point.

FIG. 4 and FIG. 5 are diagrams for explaining generation of the white light W1 in detail. The blue laser light B2 emitted from the light source unit 110 travels along the optical axis A, and is incident on the AR film 128 provided on the back surface 126 of the base portion 121 substantially vertically. By the AR film 128, the reflection of the blue laser light B2 is prevented, so the blue laser light B2 is incident on the base portion 121 with a high transmittance.

The blue laser light B2 transmitted through the AR film 128 is caused to transmit through the base portion 121 and the dichroic film 127 in this order, and is collected on the phosphor layer 122. In this embodiment, an irradiation spot of the blue laser light B2 with respect to the phosphor wheel 120 is fixed. Thus, when the motor 124 causes the base portion 121 to rotate, a light collection point 150 on which the blue laser light B2 is collected is relatively moved around the rotation axis O. As a result, excessive irradiation or the like to the phosphor layer 122 is prevented, and deterioration of the phosphor layer 122 which is associated with the irradiation of the blue laser light B2 is suppressed.

By the blue laser light B2 collected on the phosphor layer 122, phosphor included in the phosphor layer 122 is excited. As a result, from the light collection point 150, yellow light having a predetermined wavelength spectrum is emitted in various directions.

FIG. 5 is a schematic diagram for explaining a light path of yellow light generated from the light collection point 150. From the light collection point 150 of the blue laser light B2, yellow light is emitted in various directions. The yellow light (not shown) emitted from the light collection point 150 toward the collimating optical system 160 is emitted to the image generation system 200 by the collimating optical system 160.

For example, the collimating optical system 160 is set to be closer to the phosphor layer 122, with the result that a light collection efficiency of the yellow light can be improved, and the high luminance can be achieved. As shown in FIG. 4, in this embodiment, a distance between the phosphor wheel 120 and the collimating optical system 160 is set to fall within a range of 0.5 mm to 1 mm. The distance is not of course be limited to this.

Yellow light emitted from the light collection point 150 toward the base portion 121 (dichroic film 127) also exists. FIG. 5 shows yellow lights Y1, Y2, and Y3 that are incident on the dichroic film 127 at different incident angles.

When the incident angles of the yellow lights Y1, Y2, and Y3 are set to $\theta 1$, $\theta 2$ and $\theta 3$, the incident angle $\theta 2$ is the deepest (smallest) angle, and the incident angle $\theta 3$ is shallowest (largest) angle. That is, $\theta 1 < 74 < \theta 3$ is satisfied. It should be noted that in FIG. 5, for ease of explanation, refraction at a time of being incident on the dichroic film 127 from the phosphor layer 122, refraction at a time of being incident on the base portion 121 from the dichroic film 127, and the like are not taken into consideration.

The yellow light Y1 is incident on the dichroic film 127 at the deep incident angle $\theta 1$. The dichroic film 127 reflects the yellow light Y1 at a reflection angle $\theta 1$ without substantially changing the amount of light or the like of the yellow light Y1. The reflected yellow light Y1 is collected by the collimating optical system 160.

For example, in the case where the dichroic film 127 does not exist, there is a possibility that yellow light incident at a deep incident angle is transmitted through the base portion 121 and the AR film 128. Therefore, by forming the dichroic film 127, it is possible to performing light collection by reflecting even the yellow light incident at the deep incident angle.

The yellow light Y2 is incident on the dichroic film 127 at the incident angle $\theta 2$ shallower than the incident angle of the yellow light Y1. Generally, there is a case in which incident angle dependence exists in a reflection characteristic of a wavelength selection reflective film, and a part or all of wavelength components of incident light are not reflected on the dichroic film 127 but transmitted therethrough depending on the incident angle.

For example, the assumption is made that a part of the yellow light Y2 incident at the incident angle $\theta 2$ is transmitted through the dichroic film 127, and reaches the back surface 126 of the base portion 121. The yellow light Y2 is reflected by the back surface 126 at the reflection angle $\theta 2$, transmitted through the dichroic film 127 and the like again, and collected by the collimating optical system 160. It should be noted that the other components of the yellow light Y2 are reflected by the dichroic film 127 and collected by the collimating optical system 160 (not shown).

The yellow light Y3 is incident on the dichroic film 127 at the incident angle $\theta 3$ shallower than that of the yellow light Y2. A part or all of the yellow light Y3 is transmitted through the dichroic film 127 and reflected by the back surface 126 of the base portion 121 at a reflection angle $\theta 3$. As shown in FIG. 5, the yellow light Y3 reflected by the back surface 126 travels without being incident on the collimating optical system 160.

As described above, out of the yellow light reflected by the back surface 126 of the base portion 121, yellow light incident at a reflection angle (incident angle) larger than a predetermined angle (upper limit reflection angle) falls outside of a light collection range of the collimating optical system 160, and is therefore difficult to be collected. It should be noted that the upper limit reflection angle is a maximum reflection angle of collectable reflection light, and is determined on the basis of a distance between the collimating optical system 160 and the phosphor wheel 120, a thickness of the base portion 121, and the like, for example.

By the collimating optical system 160, yellow light (yellow light incident on the collimating optical system 160), the reflection angle (incident angle) of which is smaller than the upper limit reflection angle and the blue laser light B2' transmitted through the phosphor layer 122 are synthesized, with the result that the white light W1 is generated.

As described above, in this embodiment, the part of the yellow light emitted from the phosphor layer 122 is reflected by the dichroic film 127 and the like, and is collected by the collimating optical system 160. As a result, even yellow light that is emitted to the side opposite to the collimating optical system 160 can be collected again. As a result, a light collection efficiency of the yellow light is improved, and a high luminance can be achieved.

A description will be given on heat generation of the phosphor layer 122 associated with irradiation with the blue laser light B2. When the phosphor layer 122 is irradiated with the blue laser light B2, heat is generated from the phosphor layer 122. The generated heat is transmitted to the base portion 121, and a temperature in the vicinity of the band-like area 132 where the phosphor layer 122 is provided is increased. Therefore, a temperature difference is caused between a circumferential portion of the base portion 121 and the center portion, and from the band-like area 132 to the center area 133, a deviation in temperature distribution is caused.

When the temperature difference is caused between the circumferential portion of the base portion 121 and the center portion, and the deviation in temperature distribution is caused, there is a possibility that a difference of a thermal expansion amount between the circumferential portion and the center portion causes a distortion of the base portion 121. For example, the circumferential portion (outer circumferential portion) is deformed like a ripple, and the disc shape cannot be maintained. As a result, it is difficult to appropriately irradiate the phosphor layer 122 with the blue laser light B2. Further, the distance or the like between the base portion 121 and the collimating optical system 160 is shifted, resulting in a reduction of the light collection efficiency. Furthermore, such a trouble that the deformed base portion 121 is in contact with another component such as the collimating optical system 160 and the like.

To solve the problem as described above, in this embodiment, on the center area 133 of the support surface 125, the heat conduction member 123 is provided so as to be adjacent to the phosphor layer 122. The heat conduction member 123 is configured by a member having a higher heat conductivity than the base portion 121. Therefore, heat transmitted from the phosphor layer 122 to the base portion 121 is quickly diffused through the heat conduction member 123 to the center area 133 of the base portion 121. As a result, the deviation of the temperature distribution in the base portion 121 is sufficiently alleviated, and the base portion 121 has a substantially uniform temperature distribution entirely. As a result, the deformation or the like of the base portion 121 associated with the deviation of the temperature distribution can be sufficiently suppressed.

It should be noted that the rotor 130 connected to the back surface 126 of the base portion 121 may be configured by a member having a higher heat conductivity than the base portion 121 like the heat conduction member 123. Then, with a heat conduction adhesive or the like, the rotor 130 and the base portion 121 may be thermally connected. As a result, the rotor 130 can be caused to function in a similar way to the heat conduction member 123. That is, heat transmitted from the phosphor layer 122 to the base portion 121 can be diffused to the center of the base portion 121. As a result, the deformation or the like of the base portion 121 associated with the deviation of the temperature distribution is further suppressed.

In the example shown in FIG. 4, the rotor 130, an area of which is smaller than that of the heat conduction member 123 is connected to the back surface 126 of the base portion 121. For example, a size of a connection surface of the rotor 130, which is connected to the back surface 126 is set to be substantially similar to that of the heat conduction member 123, with the result that a diffusion function of the heat from the circumferential portion to the center portion can be improved. That is, the connection area 134 to which the rotor 130 is connected is expanded to a position where the heat is generated, with the result that the heat can be diffused sufficiently. For example, the center area 133 and the connection area 134 are set to have substantially the same size and shape. Of course, the setting is not limited to this.

In order to suppress the deformation of the base portion 121 associated with the deviation of the temperature distribution, there is a method of increasing a rigidity of the base portion 121 by increasing a thickness of the base portion 121, for example. Hereinafter, generation of white light in the case of increasing the thickness of the base portion 121 will be described.

Figure 6:
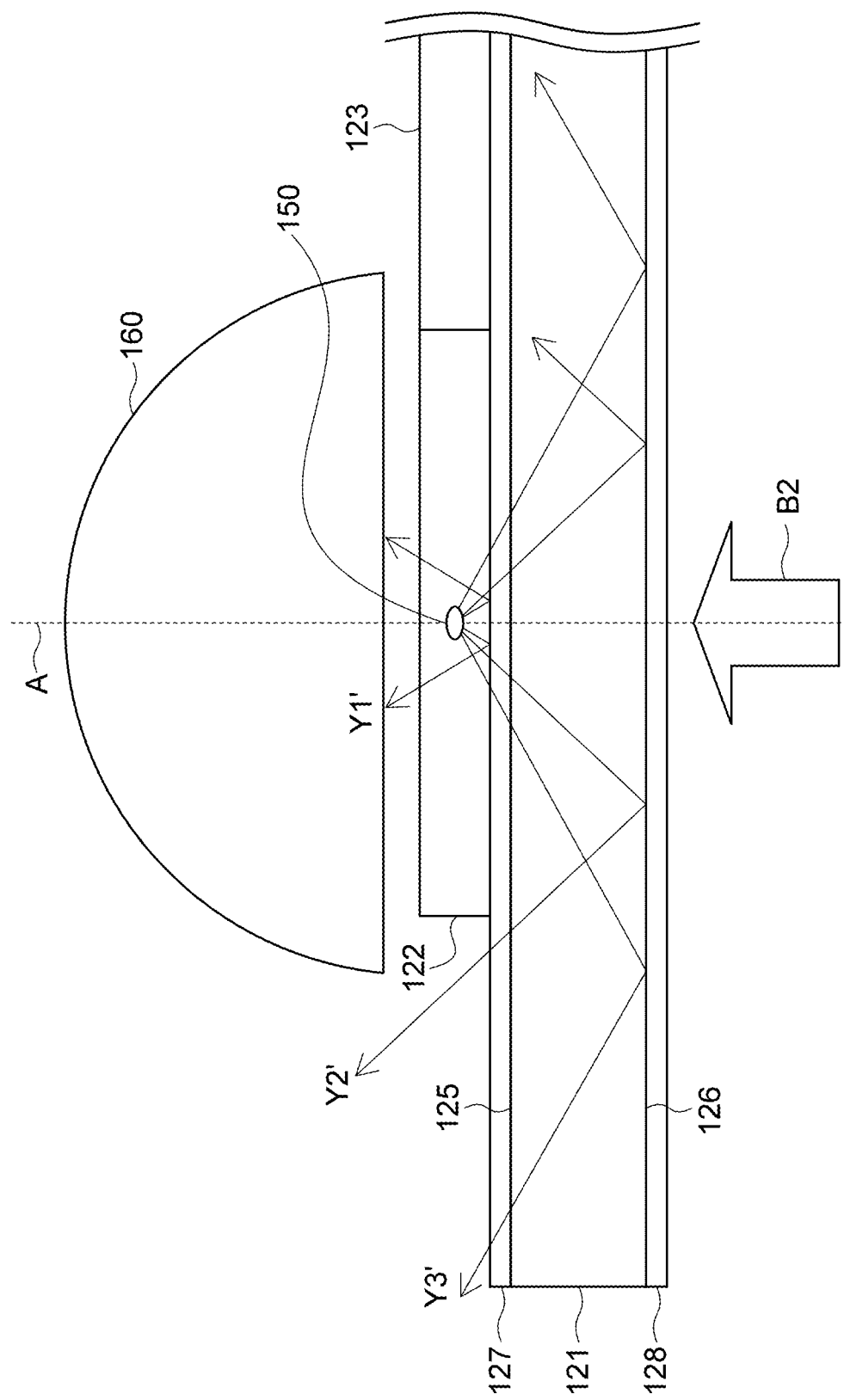
FIG. 6 A schematic diagram for explaining a light path of yellow light on a base portion, a thickness of which is increased.

FIG. 6 is a schematic diagram for explaining a light path of yellow light on the base portion 121 the thickness of which is increased. FIG. 6 shows yellow lights Y1', Y2' and Y3' emitted from the light collection point 150, and incident angles of the yellow lights are similar to the incident angles of the yellow lights Y1, Y2, and Y3 shown in FIG. 5, respectively ($\theta1$, $\theta2$, and $\theta3$).

The yellow light Y1' is not affected by a change of the thickness of the base portion 121. The yellow light Y1' is reflected by the dichroic film 127, and collected by the collimating optical system 160. On the other hand, the yellow lights Y2' and Y3' are reflected by the back surface 126 of the base portion 121, and pass through a light path different from the yellow lights Y2 and Y3 shown in FIG. 5 due to the increase of the thickness of the base portion 121. In particular, the yellow light Y2' is reflected on a position away from the optical axis A of the back surface 126 as compared to the yellow light Y2 shown in FIG. 5. As a result, the yellow light Y2' falls outside of the light collection range of the collimating optical system 160 and is not collected. As described above, when the thickness of the base portion 121 is increased, the amount of collected yellow light is decreased, and thus the light collection efficiency is decreased.

Figure 7:
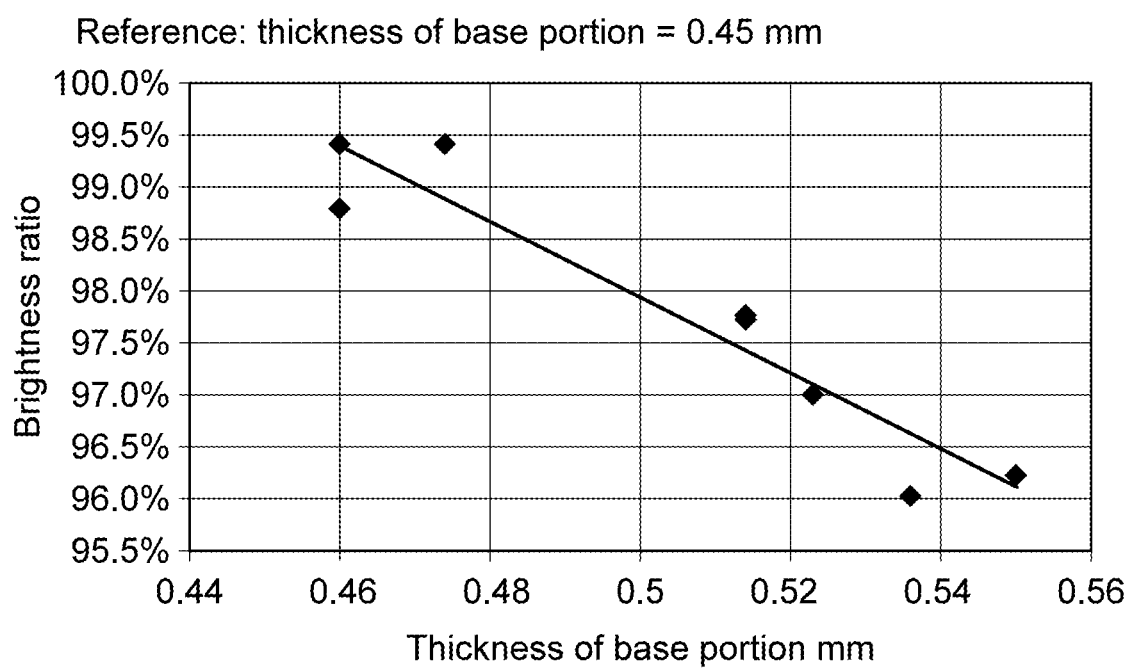
FIG. 7 A graph showing an example of a relationship between the thickness of the base portion and a collected light amount.

FIG. 7 is a graph showing an example of a relationship between the thickness of the base portion and the amount of collected light. A horizontal axis indicates the thickness of the base portion 121 of the phosphor wheel 120. A vertical axis indicates a brightness ratio at a time when the case where the thickness of the base portion 121 is 0.45 mm is set as 100%, that is, a collected light amount ratio. As shown in the graph of FIG. 7, the brightness is decreased substantially in proportion to the thickness of the base portion 121.

As described above, in the case where the thickness of the base portion 121 is increased, the yellow light is reflected on the back surface 126 of the base portion 121 in a further spread manner. In another perspective, it can be said that a light emission point size of the yellow light including the yellow light reflected on the back surface 126 becomes larger in proportion to the thickness of the base portion 121. As a result, in the collimating optical system 160 a taking efficiency (light collection efficiency) of the yellow light or the like is decreased, and for example, the luminance (brightness) of the white light W1 emitted from the light source apparatus 100 is decreased.

As described above, in this embodiment, by providing the heat conduction member 123 in the area in which heat is desired to be diffused, the deformation of the base portion 121 associated with the deviation of the temperature distribution is suppressed. Thus, it is possible to reduce the thickness of the base portion 121, and sufficiently improve the light collection efficiency of the yellow light. As a result, a higher luminance of the image display apparatus 500 can be achieved.

As described above, according to this embodiment, in the image display apparatus 500, a part of visible light emitted from the phosphor layer 122 is reflected by the dichroic film 127. As a result, it is possible to improve the light collection efficiency of the visible light. Further, the heat conduction member 123 diffuses heat transmitted from the phosphor layer 122 to the base portion 121. Thus, it is possible to suppress the deformation or the like of the base portion 121 due to the deviation of the temperature distribution. As a result, it is possible to achieve image displaying with a high luminance with a high reliability.

In a light source of a Phosphor+Laser system in which the phosphor and laser light are combined, generally, used is such a system that a phosphor wheel on which the phosphor is applied is rotated, and the rotating phosphor is irradiated with laser light. An application position of the phosphor is a position closer to an outer circumference on the phosphor wheel in order to reduce a load (deterioration) due to the laser irradiation to the phosphor. Therefore, within a plane of the phosphor wheel, a heat source is disposed in the vicinity of the outer circumference of the phosphor wheel at all times, so a structure is provided in which a temperature difference from the center portion is likely to occur.

Even in the case where a configuration to cool the heat generation from the phosphor due to irradiation with the laser light is adopted, for example, if heat generation of the phosphor or the like is caused beyond a cooling efficiency thereof, there is a possibility that a deviation of the temperature distribution of the base may be caused. As a result, an unintended deformation or the like of the base occurs, and a malfunction of the operation is caused.

For example, the deformation of the base causes a design value of the optical system to be shifted, and fluorescence cannot be caught by a collimating optical system or the like, thereby causing a reduction of the luminance. Further, a distance between the collimating optical system and a light emission point is varied each time the phosphor wheel is rotated by one, with the result that a flicker phenomenon occurs. In the case where a distortion is further increased, the phosphor wheel and the collimating optical system are in contact with each other, and the rotation of the phosphor wheel is stopped. Then, there is a possibility that the phosphor wheel may be damaged.

For example, for an adhesion portion on which a motor or the like is adhered on the center of the phosphor wheel, an extra stress is placed thereon due to the distortion of the phosphor wheel. Thus, there is concern that peeling or the like of the adhesion is caused. Further, in the case where the phosphor wheel has an opening portion (hole) in which the motor or the like is fitted, there is a possibility that a stress is concentrated on the opening portion. As a result, there is a fear that a split, a crack, or the like may be caused in the phosphor wheel due to the distortion of the phosphor wheel.

In the image display apparatus 500 according to this embodiment, the heat conduction member 123 having a high heat conduction property is provided in the vicinity of the phosphor layer 122. Further, on a surface side opposite to the phosphor layer 122, the rotor 130 having the high heat conduction property is provided. The heat conduction member 123 and the rotor 130 are thermally bonded to the base portion 121 in such a manner that heat generation from the phosphor layer 122 as a heat source is diffused to the entire base portion 121.

The heat generated in the phosphor layer 12 is diffused to the entire base portion 121 by the heat conduction member 123 and the rotor 130. As a result, the deviation of the temperature distribution on the base portion 121, which may be a factor of the deformation or the like of the base portion 121 is sufficiently suppressed. Thus, shifting of the design value or the like of the optical system is reduced, and therefore it is possible to prevent a reduction of the luminance, an occurrence of the flicker phenomenon, or the like sufficiently. As a result, it is possible to provide a stable light source by using the phosphor wheel 120.

For example, in the case where irradiation is performed with high-output laser light as excitation light, it is possible to suppress the distortion of the base portion 121 from being increased. Thus, a situation in which the phosphor wheel 120 is in mechanical contact with another component and stopped and a situation of peeling of the adhesion portion can be avoided sufficiently. As a result, it is possible to achieve highly reliable image displaying can be achieved.

Further, in this embodiment, the phosphor wheel 120 is configured with the use of the base portion 121 having no opening portion. As a result, even if an ununiform stress is placed, there is no portion on which a stress or the like is concentrated, so a split, a crack, and the like are unlikely to occur. Thus, the high reliability of the phosphor wheel 120 is maintained. Further, for example, by using the heat conduction member 123 and the rotor 130 having material quality whose thermal expansion rate is close to that of the base portion 121, it is possible to reduce a stress caused by a difference of a thermal expansion amount between respective members. As a result, peeling of the adhesion, breakage of the base portion 121, and the like can be sufficiently prevented.

In this embodiment, the heat conduction member 123 and the rotor 130 are provided on the both sides of the support surface 125 and the back surface 126 of the base portion 121 so as to cover the center of the base portion 121. That is, by the heat conduction member 123 and the rotor 130, the base portion 121 can be reinforced. As a result, even in the case where the thickness of the base portion 121 is sufficiently thin, it is possible to suppress the deformation or the like of the base portion 121.

For example, in the light path of yellow light shown in FIG. 5, the yellow light Y3 is not collected by the collimating optical system 160. The thickness of the base portion 121 is less than that in the example shown in FIG. 5, with the result that a reflection position of the yellow light Y3 on the back surface 126 can be set to be closer to the optical axis A, for example. As a result, it is possible to reduce the size of the light emission point of the yellow light, and thus the yellow light Y3 can be collected, for example.

As described above, by reducing the thickness of the base portion 121, a light collection efficiency (use efficiency) of fluorescence is improved, and thus a high luminance can be achieved. Further, making the base portion 121 thinner leads to a reduction in cost of the apparatus. As a result, it is possible to achieve image displaying with a high luminance with a high reliability with a cost kept down.

Second Embodiment

An image display apparatus according to a second embodiment of the present technology will be described.

In the following description, description on configurations and actions similar to those of the image display apparatus 500 described in the embodiment will be omitted or simplified.

Figure 8A:
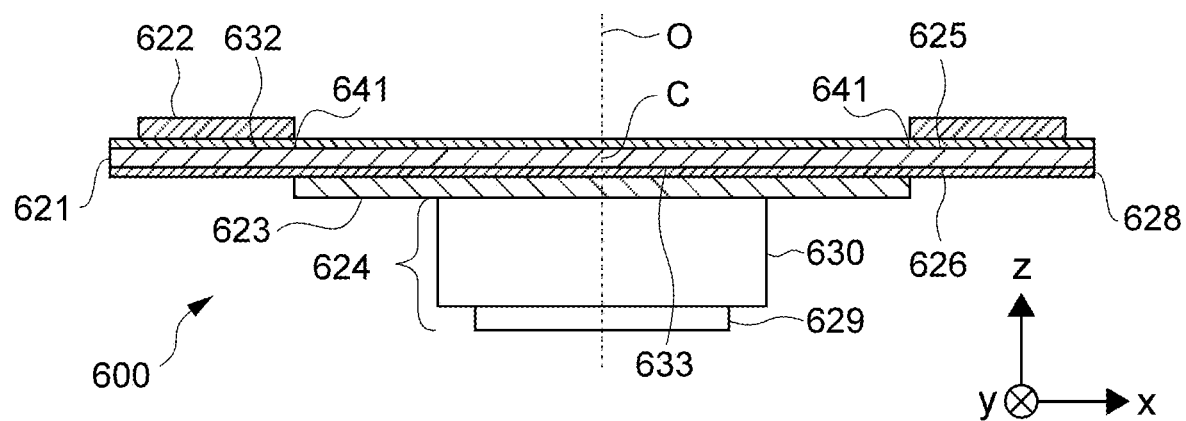
FIG. 8 A schematic diagram showing a configuration example of a phosphor wheel according to a second embodiment.
Figure 8B:
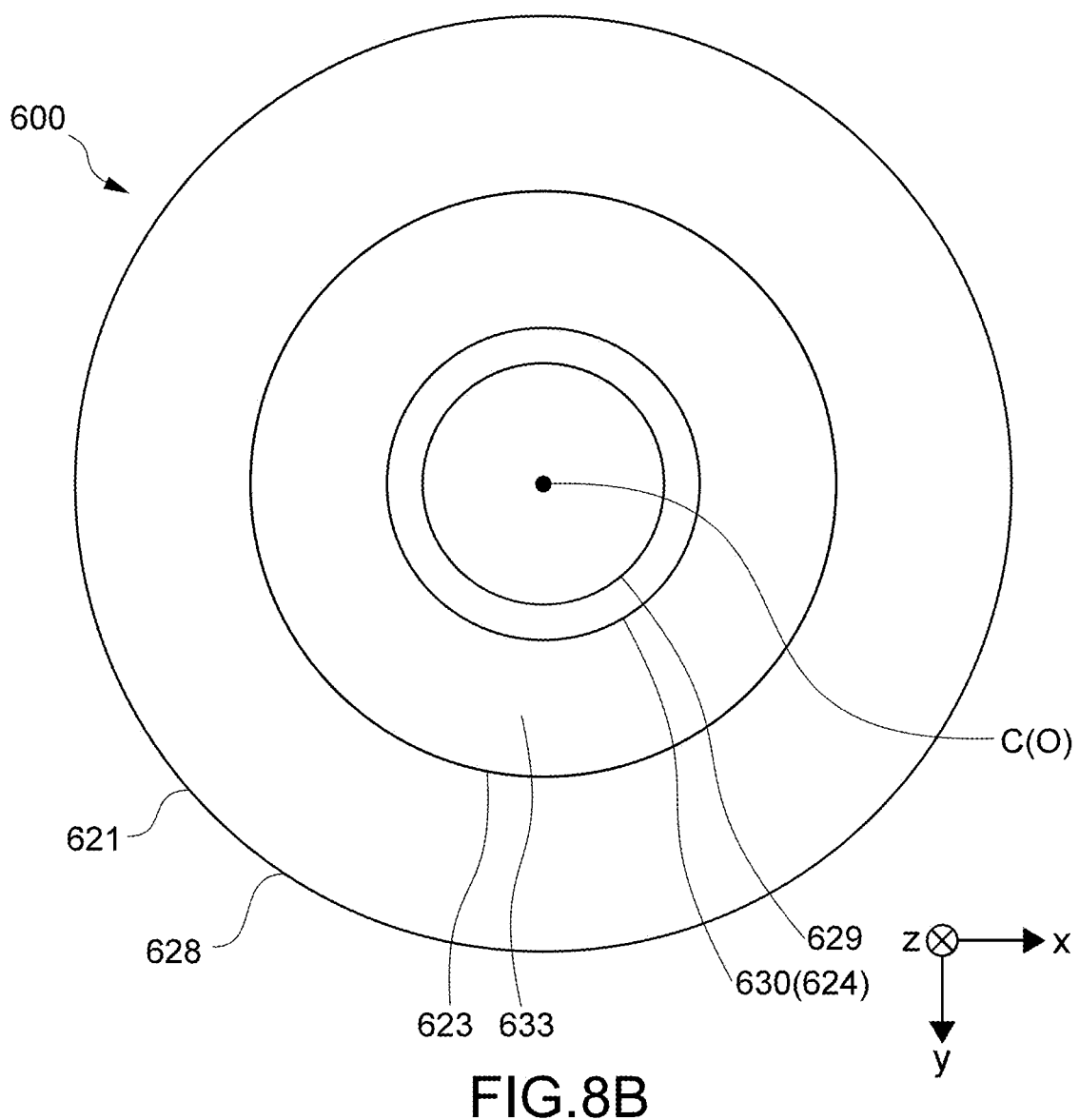

FIG. 8 is a schematic diagram showing a configuration example of a phosphor wheel 600 according to the second embodiment. FIG. 8A is a cross-sectional view of the phosphor wheel 600 taken along a line including the center C of a support surface 625 (cross-sectional view of a motor 624 is omitted). FIG. 8B is a plan view of the phosphor wheel 600 when viewed from a back surface 626 side.

In the phosphor wheel 600 according to this embodiment, a heat conduction member 623 is provided on a film of an AR film 628 formed on the back surface 626 of a base portion 621. As shown in FIG. 8B, on the back surface 626 of the base portion 621, a center area 633 including the center C is set. In the center area 633, the heat conduction member 623 is provided.

The center area 633 is set on a back side of an inner circle 641 of a band-like area 632 where a phosphor layer 622 is provided on the support surface 625 side. That is, an inside of a circle with a radius similar to the inner circle 641 having the center C of the back surface 626 as a center thereof corresponds to the center area 633 of the back surface 626. In other words, a circular area corresponding to a back side of the center area 133 (see FIG. 3) of the support surface 125 described in the first embodiment corresponds to the center area 633.

In addition to this, for example, an arbitrary area having no overlapped area with the light path of the blue laser light B2 may be set as the center area 633 of the back surface 626. In this embodiment, the center area 633 of the back surface 626 corresponds to an area including a center of a surface opposite thereto.

A rotor 630 is connected with the heat conduction member 623 provided in the center area 633 of the back surface 626. Thus, in this embodiment, the rotor 630 is connected with the base portion 621 through the heat conduction member 623. As shown in FIG. 8, the rotor 630 is connected with the heat conduction member 623 in such a manner that the center C of the back surface 626 and a rotation shaft of the motor 624 are met.

A method of connecting the heat conduction member 623 with the back surface 626 through the AR film 628 and a method of connecting the rotor 630 with the heat conduction member 623 are not limited. For example, those members may be thermally connected by using a heat conduction adhesive or the like.

As described above, even in the case where the heat conduction member 623 is provided on the back surface 626 of the base portion 621, the present technology can be applied. That is, it is possible to diffuse heat transmitted from the phosphor layer 622 to the circumferential portion of the base portion 621 in the base portion 621 quickly through the heat conduction member 623 provided on the center area 633 of the back surface 626. As a result, a temperature difference between the circumference of the base portion 621 and the center is relieved, and the deformation or the like of the base portion 621 associated with the deviation of the temperature distribution is suppressed.

Further, by configuring the rotor 630 and a stator 629 connected with the heat conduction member 623 by a member having a high heat conduction property, high heat radiation performance can be exerted, and thus it is also possible to efficiently cool the phosphor wheel 600. As a result, deterioration of the phosphor layer 622 or the like due to an increase of the temperature of the phosphor wheel 600 is reduced, so it is possible to extend a lifetime of the phosphor wheel 600.

Third Embodiment

Figure 9A:
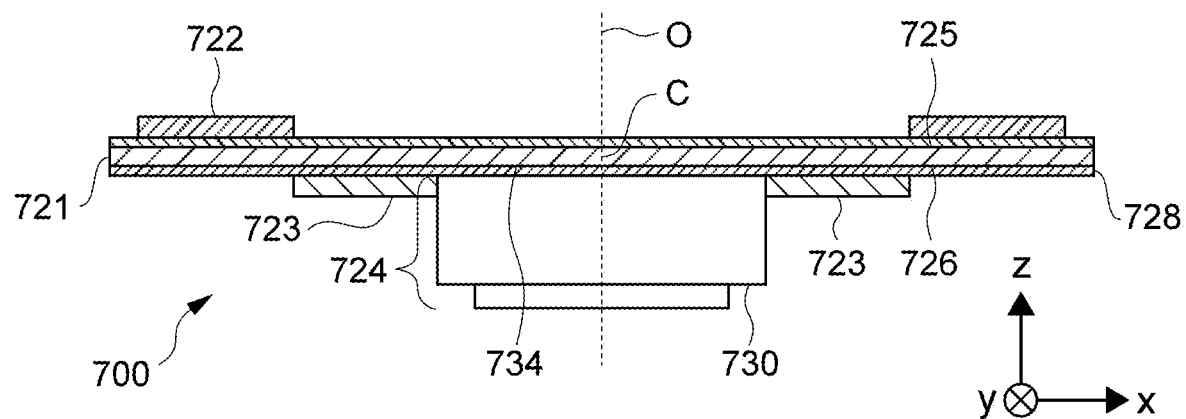
FIG. 9 A schematic diagram showing a configuration example of a phosphor wheel according to a third embodiment.
Figure 9B:
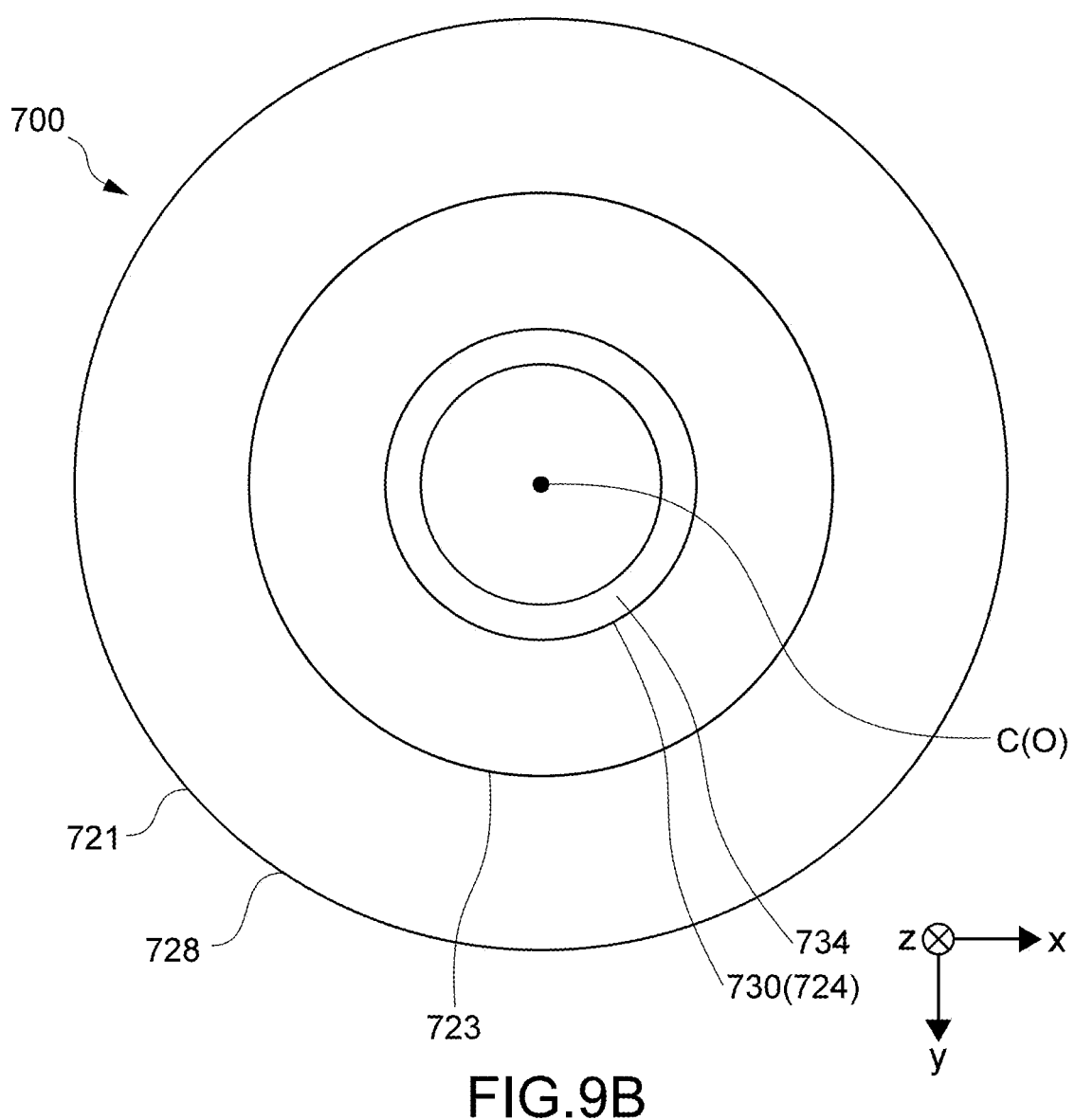

FIG. 9 is a schematic diagram showing a configuration example of a phosphor wheel according to a third embodiment. FIG. 9A is a cross-sectional view of a phosphor wheel 700 taken along a line including the center C of a support surface 725 (a cross-sectional view of a motor 724 is omitted). FIG. 9B is a plan view of the phosphor wheel 700 when viewed from a back surface 726 side.

In the phosphor wheel 700 according to the according to this embodiment, as in the first embodiment, in a connection area 734 including the center C of a back surface 726 of the base portion 721, a rotor 730 is provided through an AR film 728. Then, around the rotor 730, a ring-shaped heat conduction member 723 is provided. A position of an outer circumference of the heat conduction member 723 is substantially the same as the position of the outer circumference of the heat conduction member 623 described in the second embodiment, for example.

In this embodiment, as the rotor 730, a member having a high heat conduction property is used. Further, the heat conduction member 723 is in contact with a circumference of the rotor 730, and a heat conduction property between both the members is highly maintained. Thus, the rotor 730 and the ring-shaped heat conduction member 723 can cause heat diffusion performance to be exerted like the heat conduction members 123 and 623 described in the first and second embodiments. That is, the rotor 730 is used as a heat conduction member according to the present technology, and is provided in an area (connection area 734) including the center of the back surface 726.

As described above, with the rotor 730 and the ring-shaped heat conduction member, it is also possible to sufficiently diffuse heat transmitted from a phosphor layer 722 to the base portion 721, and it is possible to sufficiently suppress deformation or the like of the base portion 721 associated with the deviation of the temperature distribution. Further, for example, a use amount of the heat conduction member 723 or the like can be reduced, so it is possible to achieve a reduction in weight of the phosphor wheel 700 and a reduction in cost of components.

Fourth Embodiment

Figure 10A:
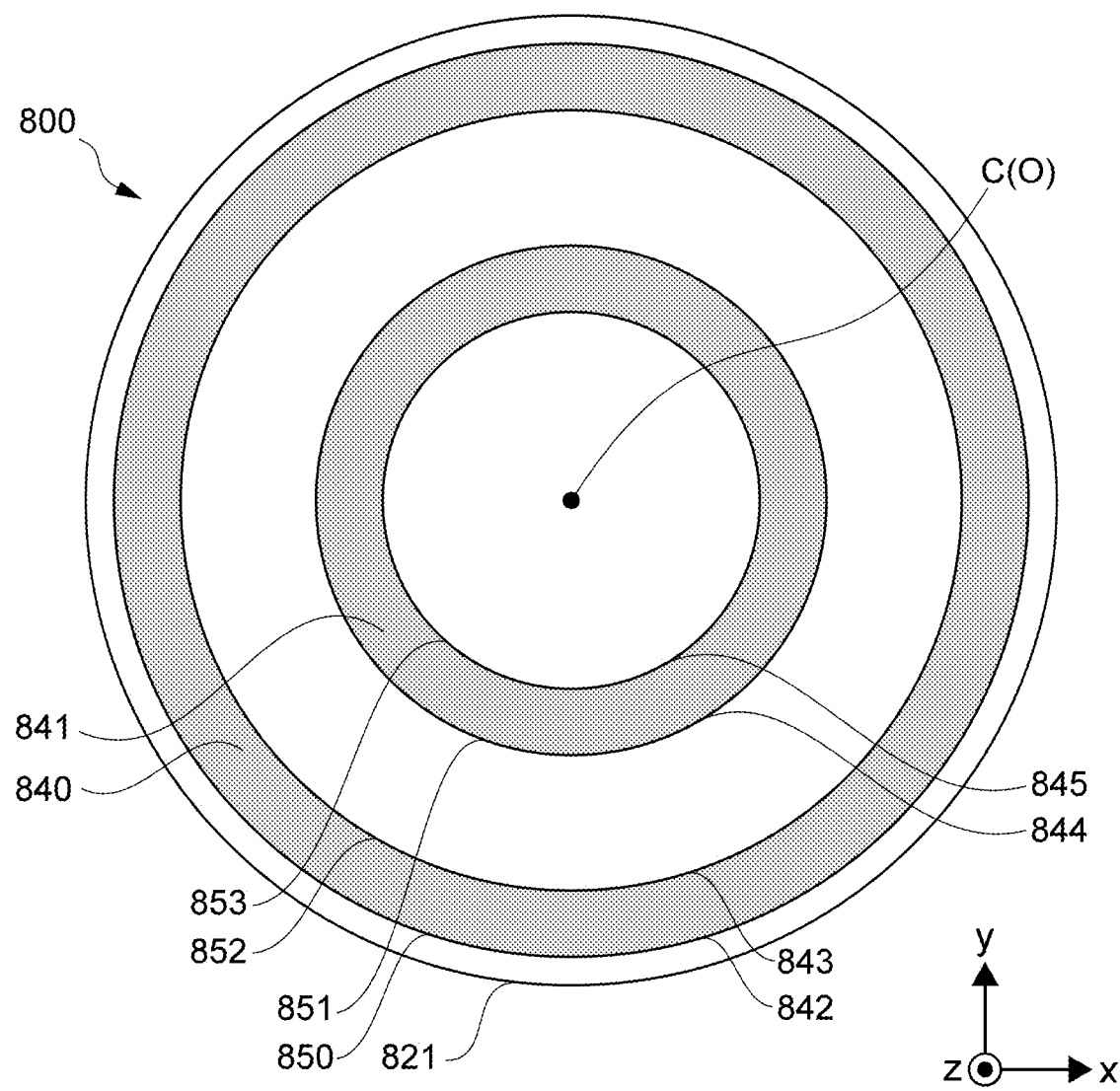
FIG. 10 A schematic diagram showing a configuration example of a phosphor wheel according to a fourth embodiment.
Figure 10B:
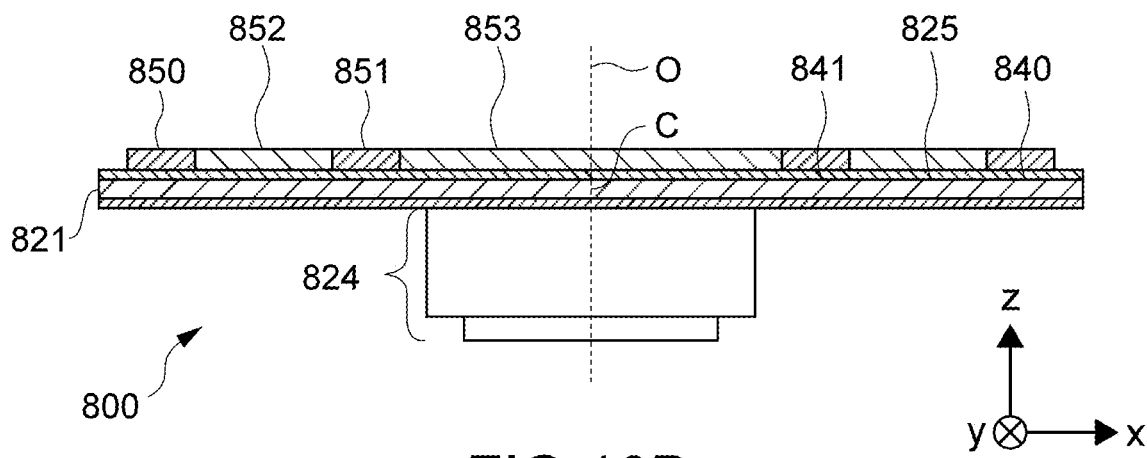

FIG. 10 is a schematic diagram showing a configuration example of a phosphor wheel according to a fourth embodiment. FIG. 10A is a plan view of a phosphor wheel 800 when viewed from a support surface 825 side. FIG. 10B is a cross-sectional view of the phosphor wheel 800 taken along a line including the center C of the support surface 825 (a cross-sectional view of a motor 824 is omitted).

In the phosphor wheel 800 according to this embodiment, a phosphor layer is provided in a first band-like area 840 set in the circumferential portion of the support surface 825 and a second band-like area 841 on an inner side of the first band-like area 840. Hereinafter, the phosphor layer provided in the first and second band-like areas 840 and 841 are described as an outer phosphor layer 850 and an inner phosphor layer 851, respectively.

The first band-like area 840 is an area surrounded by a first outer circle 842 and a first inner circle 843 smaller than the first outer circle 842. The second band-like area 841 is an area surrounded by a second outer circle 844 smaller than the first inner circle 843 and a second inner circle 845 smaller than the second outer circle 844. first outer circle 842 and inner circle 843 and the second outer circle 844 and inner circle 845 are circles having the center C of the support surface 825 as a center.

The heat conduction member is provided separately in an area between the first and second band-like areas 840 and 841 and an inside area of the second band-like area 841. Hereinafter, the heat conduction member provided in the area between the first and second band-like areas 840 and 841 is described as an outer heat conduction member 852, and the heat conduction member provided in the inside area of the second band-like area 841 is described as an inner heat conduction member 853.

The outer heat conduction member 852 is provided so as to be in contact with the outer and inner phosphor layers 850 and 851. Further, the inner heat conduction member 853 is provided on an entire inner side of the second inner circle 845 so as to be in contact with the inside the inner phosphor layer 851. In this embodiment, an area surrounded by the second inner circle 845 corresponds to an area including the center C of the support surface 825.

In the phosphor wheel 800, irradiation with excitation light according to features of the respective outer and inner phosphor layers 850 and 851 is performed. For example, the respective phosphor layers include the phosphors having the same feature, the respective phosphor layers are irradiated with laser light or the like with the same wavelength range. As a result, for example, the two phosphor layers can be excited at the same time, so it is possible to increase the light amount of emitted yellow light or the like. Thus, it is possible to improve the light emission efficiency in the phosphor wheel 800 and achieve the high luminance.

Further, for example, as the outer and inner phosphor layers 850 and 851, such a setting that phosphors having different features are included can be conducted. In this case, irradiation with excitation light can be performed in accordance with the features of the phosphors, with the result that it is possible to emit two kinds of fluorescence at the same time. As a result, various chromatic expression can be achieved, and high-quality image displaying can be achieved.

In this embodiment, by the outer heat conduction member 852, heat transmitted from the outer and inner phosphor layers 850 and 851 to a base portion 821 can be diffused to the area surrounded by the first inner circle 843 and the second outer circle 844. As a result, a deviation of the temperature distribution of the base portion 821 which is caused from the first band-like area 840 to the second band-like area 841 is suppressed.

Further, by the inner heat conduction member 853, heat transmitted from the inner phosphor layer 851 to the base portion 821 can be diffused to the inside of the second inner circle 845. As a result, heat transmitted from the phosphor layers provided separately in the two areas to the base portion 821 can be diffused to the center of the base portion 821. Thus, it is possible to entirely suppress a deviation of the temperature distribution in the base portion 821. As a result, an inclination of the temperature distribution in the entire base portion 821 is suppressed, and the deformation or the like of the base portion 821 can be reduced sufficiently. Thus, it is possible to achieve high-quality image displaying with a high reliability.

Other Embodiments

The present technology is not limited to the embodiments described above, and various other embodiments can be achieved.

In the phosphor wheel described above, the blue laser light passes through the AR film and is incident on the base portion. The blue laser light transmitted through the base portion passes through the dichroic film, and the phosphor layer is irradiated therewith. A specific configuration of the phosphor wheel is not limited, another configuration may be adopted.

For example, even in the case where the dichroic film cannot be provided on the support surface of the base portion, with the use of the heat conduction member, a deviation of the temperature distribution of the base portion can be suppressed. For example, the phosphor wheels 120, 600, 700, and 800 shown in FIG. 3, FIG. 8, FIG. 9, and FIG. 10, respectively, in the case where the dichroic film is not provided, each of the phosphor layers is directly provided on the support surface of the base portion. Further, the heat conduction member 123 shown in FIG. 3 and the outer and inner heat conduction members 852 and 853 shown in FIG. 10 are directly provided on the support surface of the base portion, respectively.

In this case, for example, in the phosphor wheel 120 shown in FIG. 3, from the phosphor layer 122, the temperature of which is increased by irradiation with the blue laser light B2 to the base portion 121 directly without passing through the dichroic film 127 or the like. Then, heat transmitted to the circumferential portion of the base portion 121 is quickly diffused to the center area 133 by the heat conduction member 123 directly connected to the base portion 121. As a result, a temperature difference between the circumferential portion and the center portion of the base portion is alleviated, and thus deformation or the like of the base portion is sufficiently suppressed.

As described above, even in the phosphor wheel with no dichroic film, it is possible to suppress deformation or the like of the base portion and achieve image displaying with a high reliability. In addition, even in the case where the AR film is not provided, or even in the case where a film or the like having another optical feature is provided, it is possible to maintain the reliability of the phosphor wheel to be high by using the heat conduction member.

In the above description, the transmission-type phosphor wheel is used in which the excitation light (blue laser light) is transmitted through the base portion, and the phosphor layer is irradiated therewith. The phosphor wheel is not limited to this. For example, the present technology can be applied to a reflection-type phosphor wheel. In the reflection-type phosphor wheel, the phosphor layer is also irradiated with excitation light, so the phosphor layer is a heat source as in the case of the transmission type. Thus, by using the heat conduction member or the like as appropriate, it is possible to reduce a deviation of the temperature distribution of the base portion. As a result, the deformation or the like of the base portion is suppressed, and yellow light or the like reflected from the phosphor wheel can be collected with high accuracy.

In the above embodiments, the heat conduction member is bonded in such a manner that heat transmitted from the phosphor layer to the base portion is diffused to the entire base portion. The method of forming the heat conduction member on the support surface or the like of the base portion is not limited.

For example, a metal film formed by evaporation or the like can be used as the heat conduction member. For example, in a predetermined area including the support surface of the base portion or a center of a back surface thereof, metal such as aluminum and the like may be evaporated so as to have a thickness of approximately 10 µm. As a result, a metal film having a high coherency with the base portion or the like is formed, and heat transmitted from the phosphor layer to the base portion is diffused to the entire base portion. Thus, a deviation of the temperature distribution of the base portion can be suppressed, and the deformation or the like of the base portion can be avoided. As a result, for example, a use amount of an adhesive or the like is reduced, and the phosphor wheel excellent in heat resistance can be achieved.

In the above description, the base portion having no opening portion (hole) is used to configure the phosphor wheel. The configuration thereof is not limited to this. The present technology can also be applied to the case where a base portion having a hole is used.

For example, an assumption is made that a hole for connecting a motor or the like is formed on the center of the base portion 121 of the phosphor wheel 120 shown in FIG. 3. In this case, from the vicinity of the phosphor layer to a surrounding of the hole of the base portion, a heat conduction member is provided in a ring-like form, with the result that it is possible to diffuse heat transmitted from the phosphor layer to the base portion to an entire base portion. Further, in the case where a motor or the like has a high heat conduction property, the motor or the like connected to the hole of the base portion and the ring-shaped heat conduction member provided around the hole are thermally connected, with the result that high heat radiation performance is exerted.

As described above, even in the case where the base portion having the hole is used, by suppressing a deviation of the temperature distribution of the base portion and an increase of the temperature, it is possible to avoid the deformation or the like of the base portion sufficiently. As a result, an amount of use of sapphire or the like used for the base portion can be reduced, so a cost reduction can be achieved.

Out of the characteristic parts according to the present technology described above, at least two characteristic parts can be combined. That is, the various characteristic parts described in the respective embodiments may be arbitrarily combined without distinction of the respective embodiments. Further, the various effects described above are merely examples and are not limited, and other effects may be exerted.

It should be noted that the present technology can take the following configurations.

(1) An image display apparatus, including:
 a base;
 a light emission body that is provided on the base, and emits visible light by being excited by excitation light;
 a dichroic film that reflects at least a part of the visible light emitted from the light emission body; and
 a heat conduction member that is provided on the base, and diffuses heat transmitted from the light emission body to the base.
(2) The image display apparatus according to (1), in which the heat conduction member is provided in a vicinity of the light emission body.
(3) The image display apparatus according to (1) or (2), in which
 the heat conduction member is provided in contact with the light emission body.
(4) The image display apparatus according to any one of (1) to (3), in which
 the light emission body is provided on a circumference of the base, and
 the heat conduction member is provided on a center of the base.
(5) The image display apparatus according to any one of (1) to (4), in which
 the base includes a support surface that supports the light emission body and an opposite surface to the support surface, and
 the heat conduction member is disposed on at least one of the support surface and the opposite surface.
(6) The image display apparatus according to (5), in which
 the base has a disc shape without a hole, and
 the heat conduction member is provided in an area including a center of at least one of the support surface and the opposite surface.
(7) The image display apparatus according to (6), in which
 the dichroic film is provided on the support surface,
 the light emission body is provided on the dichroic film provided on the support surface, and
 the excitation light is transmitted through the dichroic film from the opposite surface and is incident on the light emission body.
(8) The image display apparatus according to (6) or (7), further including:
 a rotation drive unit that causes the base to rotate.
(9) The image display apparatus according to (8), in which
 the rotation drive unit includes a rotation member that is connected to the base and has a heat conduction property.
(10) The image display apparatus according to (9), in which
 the heat conduction member is provided in the area including the center of the support surface, and
 the rotation member is connected to the area including the center of the opposite surface.
(11) The image display apparatus according to (9), in which
 the heat conduction member is provided in the area including the center of the opposite surface, and
 the rotation member is connected to the heat conduction member provided on the opposite surface.
(12) The image display apparatus according to (9), in which
 the rotation member is connected to the area including the center of the opposite surface, and
 the heat conduction member is provided around the rotation member.
(13) The image display apparatus according to any one of (5) to (12), in which
 the light emission body is provided in each of a first band-like area on a circumference of the support surface and a second band-like area inside the first band-like area, and
 the heat conduction member is provided in each of an area between the first and second band-like areas and an area including the center inside the second band-like area.

REFERENCE SIGNS LIST

W1, W2 . . . white light
Y1, Y2, Y3 . . . yellow light
B2 . . . blue laser light
100 . . . light source apparatus
120, 600, 700, 800 . . . phosphor wheel
121, 621, 721, 821 . . . base portion
122, 622, 722 . . . phosphor layer
123, 623, 723 . . . heat conduction member
124, 624, 724, 824 . . . motor
125, 625, 725, 825 . . . support surface
126, 626, 726 . . . back surface
127 . . . dichroic film
128, 728, 628 . . . AR film
129, 629 . . . stator
130, 630, 730 . . . rotor
132, 632 . . . band-like area
133, 633 . . . center area
134, 734 . . . connection area
150 . . . light collection point
160 . . . collimating optical system
200 . . . image generation system
400 . . . projection system
500 . . . image display apparatus
840 . . . first band-like area
841 . . . second band-like area
850 . . . outer phosphor layer 851 . . . inner phosphor layer
852 . . . outer heat conduction member
853 . . . inner heat conduction member

The invention claimed is:
1. An image display apparatus, comprising:
   a base;
   a first light emission body that is provided on the base, and emits visible light by being excited by excitation light;
   a dichroic film that reflects at least a part of the visible light emitted from the first light emission body; and
   a first heat conduction member that is provided on (i) the base inside of an inner circumference of the first light emission body and (ii) the dichroic film or an anti-reflective film, wherein
   the first heat conduction member diffuses heat transmitted from the first light emission body to the base,
   the base includes a support surface that supports the first light emission body and an opposite surface to the support surface,
   the first heat conduction member is disposed on at least one of the support surface and the opposite surface,
   the first light emission body is provided in a first band area of the support surface,
   a second light emission body is provided in a second band area inside the first band area, a diameter of the second band area being less than a diameter of the first band area,
   the first heat conduction member is provided in an area between the first and second band areas, and
   a second heat conduction member is provided in an area inside the second band area.
2. The image display apparatus according to claim 1, wherein
   the first heat conduction member is provided in a vicinity of the first light emission body.
3. The image display apparatus according to claim 1, wherein
   the first heat conduction member is provided in contact with the first light emission body.
4. The image display apparatus according to claim 1, wherein
   a heat conductivity of the first heat conduction member is higher than a heat conductivity of the base.
5. The image display apparatus according to claim 1, wherein
   the first heat conduction member is provided directly on the dichroic film or the anti-reflective film.
6. An image display apparatus, comprising:
   a base;
   a first light emission body that is provided on the base, and emits visible light by being excited by excitation light;
   a dichroic film that reflects at least a part of the visible light emitted from the first light emission body; and
   a first heat conduction member that is provided on (i) the base inside of an inner circumference of the first light emission body and (ii) the dichroic film or an anti-reflective film, wherein
   the first heat conduction member diffuses heat transmitted from the first light emission body to the base,
   the base includes a support surface that supports the first light emission body and an opposite surface to the support surface,
   the first heat conduction member is disposed on at least one of the support surface and the opposite surface,
   the base has a disc shape without a hole, and
   the first heat conduction member is provided in an area including a center of at least one of the support surface and the opposite surface.
7. The image display apparatus according to claim 6, further comprising:
   a rotation drive unit that causes the base to rotate.
8. The image display apparatus according to claim 7, wherein
   the rotation drive unit includes a rotation member that is connected to the base and has a heat conduction property.
9. The image display apparatus according to claim 8, wherein
   the first heat conduction member is provided in the area including the center of the support surface, and
   the rotation member is connected to the area including the center of the opposite surface.
10. The image display apparatus according to claim 8, wherein
   the first heat conduction member is provided in the area including the center of the opposite surface, and
   the rotation member is connected to the first heat conduction member provided on the opposite surface.
11. The image display apparatus according to claim 8, wherein
   the rotation member is connected to the area including the center of the opposite surface, and
   the first heat conduction member is provided around the rotation member.
12. The image display apparatus according to claim 6, wherein
   the first light emission body is provided on an outer circumference of the base, and
   the first heat conduction member is provided on a center of the base.
13. The image display apparatus according to claim 6, wherein
   the dichroic film is provided on the support surface,
   the first light emission body is provided on the dichroic from provided on the support surface, and
   the excitation light is transmitted through the dichroic film from the opposite surface and is incident on the first light emission body.
14. A light source apparatus, comprising:
   a base;
   a first light emission body that is provided on the base, and emits visible light by being excited by excitation light;
   a dichroic film that reflects at least a part of the visible light emitted from the first light emission body; and
   a first heat conduction member that is provided on (i) the base inside of an inner circumference of the first light emission body and (ii) the dichroic film or an anti-reflective film, wherein
   the first heat conduction member diffuses heat transmitted from the first light emission body to the base,
   the base includes a support surface that supports the first light emission body and an opposite surface to the support surface,
   the first heat conduction member is disposed on at least one of the support surface and the opposite surface,
   the first light emission body is provided in a first band area of the support surface,
   a second light emission body is provided in a second band area inside the first band area, a diameter of the second band area being less than a diameter of the first band area, the first heat conduction member is provided in an area between the first and second band areas, and a second heat conduction member is provided in an area inside the second band area.

15. The light source apparatus according to claim 14, wherein a heat conductivity of the first heat conduction member is higher than a heat conductivity of the base.

16. The light source apparatus according to claim 14, wherein the first heat conduction member is provided directly on the dichroic film or the anti-reflective film.

* * * * *